United States Patent [19]

Zidovec et al.

[11] Patent Number: 5,320,757
[45] Date of Patent: Jun. 14, 1994

[54] METHOD OF INHIBITING CALCIUM OXALATE SCALE DEPOSITION

[75] Inventors: Davor F. Zidovec; Alexander D. Fisher, both of Jacksonville, Fla.

[73] Assignee: Betz Laboratories, Inc., Trevose, Pa.

[21] Appl. No.: 42,971

[22] Filed: Apr. 5, 1993

[51] Int. Cl.$^5$ .................................. C02F 5/10
[52] U.S. Cl. .................... 210/701; 162/36; 162/48; 162/76; 210/698; 252/180
[58] Field of Search ............... 162/36, 48, 76; 210/698-701; 252/180

[56] References Cited

U.S. PATENT DOCUMENTS

| | | | |
|---|---|---|---|
| 3,715,307 | 2/1973 | Johnson et al. | 210/58 |
| 4,126,549 | 11/1978 | Jones et al. | 210/701 |
| 4,223,120 | 9/1980 | Kurowsky | 252/180 |
| 4,575,425 | 3/1986 | Boffardi et al. | 210/701 |
| 4,804,476 | 2/1989 | Sinkovitz et al. | 210/701 |
| 4,872,995 | 10/1989 | Chen et al. | 210/699 |
| 4,941,946 | 7/1990 | Henn et al. | 210/701 |
| 5,015,390 | 5/1991 | Chen et al. | 210/698 |
| 5,062,962 | 11/1991 | Brown et al. | 210/698 |
| 5,135,661 | 8/1992 | Patel | 210/698 |

FOREIGN PATENT DOCUMENTS 2005982 6/1990 Canada .
2181735 4/1987 United Kingdom ............... 210/701

OTHER PUBLICATIONS

Chem. Abstracts 116:257719W, 1992.

Primary Examiner—Peter A. Hruskoci
Attorney, Agent, or Firm—Alexander D. Ricci; Steven D. Boyd

[57] ABSTRACT

Hydrolyzed copolymers (A) maleic anhydride with (B) at least one more ethylenically unsaturated monomer other than acrylic acid or methacrylic acid or with a mixture of (B) and (C) acrylic acid or methacrylic acid are employed in a process to inhibit calcium oxalate formation and deposition.

4 Claims, No Drawings

METHOD OF INHIBITING CALCIUM OXALATE SCALE DEPOSITION

FIELD OF THE INVENTION

The present invention relates to the inhibition of calcium oxalate scale deposition in paper production equipment. More particularly, the present invention relates to the control of calcium oxalate deposition in bleach plants and sulfite mills in paper production processes.

BACKGROUND OF THE INVENTION

Calcium oxalate scaling is a major problem in the paper industry, in particular but not exclusively in bleach plants for both kraft and mechanical mills, and in sulfite pulping mills. Calcium oxalate depositions hinder the normal plant operation and decrease the quality of paper produced by increasing the "dirt count". Calcium oxalate originates from oxalic acid present in the wood or formed by oxidation processes during pulping or bleaching; and calcium which can also be present in the wood or enter the system in the process water.

In bleach plants, calcium oxalate scale is typically found on face wires, pumps, pipes, screw presses and down stream process equipment. In sulfite mills the most common calcium oxalate scaling sites are evaporators and liquor handling equipment.

U.S. Pat. No. 4,872,995 to Chen et al., discloses methods of controlling the formation of calcium oxalate in aqueous systems in which (meth)acrylic acid/allyl ether copolymers are employed. The use of poly(epoxysuccinic) acid to inhibit scale formation, including calcium scale, is disclosed in U.S. Pat. No. 5,062,962 to Brown et al.

Canadian Patent Application No. 2,005,982 discloses a process of inhibiting the formation of calcium carbonate scale in wood pulp production comprising adding to the pulp, a hydrolyzed copolymer of maleic anhydride with a monoethylenically unsaturated monomer or a mixture of monomers provided that the copolymer is other than a maleic acid/(meth)acrylic acid copolymer. The preferred copolymer is a hydrolyzed copolymer of (A) maleic anhydride with (B) at least one monoethylenically unsaturated monomer other than acrylic or methacrylic acid or with a mixture of (B) and (C) acrylic acid or methacrylic acid. The copolymer is added to the pulp liquor.

U.S. Pat. No. 5,015,390 discloses a method for controlling scale formation in acqueous systems comprising treating the system with a water soluble polymer comprising an ethylenically unsaturated dibasic carboxylic acid or anhydride preferably maleic acid or anhydride and at least one quaternary dialkyldiallyl ammonium monomer preferably dimethyldiallyl ammonium chloride.

It was discovered that traditional inhibitors for calcium carbonate, such as phosphonates, polyacrylates and polyphosphates have only a modest effect on calcium oxalate control. In general, the inhibiting effect of a compound is specific for a sparingly soluble salt as this effect depends on structure compatibility between compound and crystal.

SUMMARY OF THE INVENTION

The present inventors discovered that certain hydrolyzed copolymers of maleic anhydride with vinyl acetate and ethyl acrylate are effective at inhibiting calcium oxalate scale formation and deposition in aqueous systems. The treatment of an aqueous stream in areas where calcium oxalate may form such as in bleach plants or sulfite mills with the copolymer in accordance with the present invention has been found to be effective in inhibiting the formation or deposition of calcium oxalate.

DESCRIPTION OF THE PREFERRED EMBODIMENTS

The present invention is directed to a method for inhibiting calcium oxalate scale formation and deposition in aqueous systems. In particular, the present invention relates to the inhibition of calcium oxalate scale formation and deposition in the papermaking industry. The method comprises adding to an aqueous stream prior to equipment where calcium oxalate scale may form, a copolymer. The copolymer employed in the method of the present invention comprises a copolymer of maleic anhydride with certain monoethylenically unsaturated monomers or a mixture of monomers. In papermaking systems the copolymer may be added to the pulp slurry in bleach plants or the liquor in sulfite pulping mills.

The calcium oxalate scale control method of the present invention comprises adding to an aqueous system in which calcium oxalate scale is a problem, from about 1 to 100 parts per million of a hydrolyzed copolymer of maleic anhydride with a monoethylenically unsaturated monomer or a mixture of monomers, provided that the copolymer is other than maleic acid/(meth)acrylic acid copolymer. The preferred copolymer is a hydrolyzed copolymer of (A) maleic anhydride with (B) at least one monoethylenically unsaturated monomer other than acrylic or methacrylic acid or a mixture of (B) and (C) acrylic acid or methacrylic acid.

The copolymer may be produced from the monomers in a molar ratio of maleic anhydride to other monomer of from about 100:1 to 1:2. Within these limits, the ratio may vary according to the water solubility of the polymer units derived from either monomer. The ratio generally increasing with the decreasing solubility of units derived from the other monomers. Preferably, the copolymer has a molar ratio of maleic anhydride to other monomers of at least 1:1 such as from about 1:1 to 100:1, preferably 1.3:1 to 40:1 and most preferably 2.5:1 to 7:1. The copolymer preferably has the molecular weight of up to about 10,000.

The ethylenically unsaturated comonomers (B) can be selected from a wide range of compounds, for example: crotonic acid, itaconic acid, aconitic acid, esters of such acids, esters of acrylic or methacrylic acid, particularly ethylacrylate, methylmethacrylate, acrylonitrile, acrylamide, vinyl acetate, styrene, alpha methylstyrene, methylvinylketone, acrolein, ethylene, propylene or mixtures thereof.

When mixtures of the monomers are used, the resulting polymer may be e.g., a terpolymer derived from maleic anhydride and two other monomers. Such terpolymers are, for example, those derived from maleic anhydride with two ethylenically unsaturated monomers selected from: acrylic acid, methacrylic acid, crotonic acid, itaconic acid, aconitic acid, ethylacrylate, methylmethacrylate, other esters of said acids, acrylonitrile, acrylamide, vinyl acetate, styrene, alpha methylstyrene, methylvinylketone, acrolein, ethylene and propylene. The molar ratio of the two monomers to each other preferably being from about 1:3 to 3:1, most preferably 1:2 to 2:1.

Suitable copolymers include copolymers of maleic anhydride with at least one monoethylenically unsaturated acid or an ester, amide or water soluble salt thereof and, optionally, with at least one monoethylenically unsaturated hydrocarbon. Preferred copolymers include allyl sulfonic acid, copolymers of maleic anhydride with an allylic acid or ester, especially allyl sulfonic acid, copolymers of maleic anhydride with an acrylic amide and optionally a vinyl carboxylate, especially copolymers of maleic anhydride with N,N-dimethyl acrylamide and copolymers of maleic anhydride, the sodium salts of acrylamido methylpropane sulfonic acid and vinyl acetate, and copolymers of maleic anhydride with an ester of a monoethylenically unsaturated acid and either a monoethylenically unsaturated acid or a monoethylenically unsaturated hydrocarbon, especially terpolymers of maleic anhydride with an allyl acrylate or alkyl methacrylate and acrylic acid, methacrylic acid or an aliphatic olefin such as ethylene, propylene, hexenes, octenes and decenes.

Another preferred embodiment of the present invention uses a hydrolyzed terpolymer of maleic anhydride either with (A) vinyl acetate and another ethenically unsaturated monomer selected from the group consisting of ethyl acrylate, acetylamide, methyl vinyl ketone, acrylonitrile and crotonic acid, where the molar ratio of vinyl acetate to the other monomer is 1:2 to 2:1, or with (B) a 1:1 molar-ratio of methylmethacrylate with ethylacrylate; or of methylacrylate and acrolein.

In one especially preferred embodiment of the present invention, there is used a hydrolyzed terpolymer of maleic anhydride with vinyl acetate and ethyl acrylate, the molar ratio of maleic anhydride to the combined moles of vinyl acetate and ethylacrylate preferably being from about 2.5:1 to 5:1, the molar ratio of vinyl acetate to ethylacrylate preferably being 1:4 to 4:1 especially 1:2 to 2:1 and the molecular weight of the terpolymer preferably being in the range below 4000. The especially preferred terpolymer is available as Belclene 283 from Ciba-Geigy.

The copolymers may be made in a known manner e.g., by polymerization in a solvent especially a reactive solvent using a free radical initiator such as benzoyl peroxide, di-tertiary butyl peroxide or monobutylhydroperoxide. The polymer is then hydrolyzed using water, dilute acid or alkali.

The present invention will now be further described with reference to a number of specific examples which are to be regarded solely as illustrative and not as restricting the scope of the present invention.

EXAMPLES

Static calcium oxalate inhibition testing was accomplished by adding the treatment agent to be tested to an aqueous solution containing 100 ppm oxalate and 88 ppm calcium. After addition of the treatment agent, the solution was held at 60° C. for one hour, filtered and analyzed for calcium content. The percent inhibition was calculated as the relative amount of calcium remaining in solution. Table 1 summarizes the results of testing with the preferred treatment agent of the present invention, a hydrolyzed copolymer of maleic anhydride with vinyl acetate and ethylacrylate.

TABLE 1

| Treatment | Calcium Oxalate % Inhibition | | | |
|---|---|---|---|---|
| | pH | | | |
| ppm | 9.5 | 7.0 | 5.5 | 4.0 |
| 0 | 0 | 0 | 0 | 0 |
| 5 | — | 56 | 30 | 0 |
| 10 | 100 | 77 | 44 | 0 |
| 20 | 96 | 95 | 58 | 0 |
| 40 | 100 | 88 | 48 | 15 |

Table 2 summarizes the results of calcium oxalate inhibition testing for commercial calcium oxalate scale inhibitors at a treatment concentration of 50 parts per million, pH 9.5 with the procedure described above.

TABLE 2

| Calcium Oxalate Inhibition | |
|---|---|
| Treatment Agent | % Inhibition |
| Dequest 2000 | 50 |
| Actophos | 10 |
| Goodrite 732 | 23 |
| Belclene 283 | 94 |

Table 3 summarizes testing which compares the inhibiting effect of a variety of commercial calcium carbonate inhibitors at inhibiting calcium oxalate. The results show that calcium carbonate inhibitors are not inherently calcium oxalate inhibitors and that the effects of the present invention are surprising and unexpected.

TABLE 3

| Test Conditions: | |
|---|---|
| $CaCO_3$ Testing | $CaC_2O_4$ Testing |
| 50 ppm Ca | 100 ppm Ca |
| 500 ppm $CO_3$ | 88 ppm $C_2O_4$ |
| pH = 10 | pH = 9.5 |
| Dose: 10 ppm Actives | Dose: 50 ppm Actives |
| 70° C. - 1 Hour | 60° C. - 1.5 Hours |

| | % Inhibition | |
|---|---|---|
| Treatment Agent | $CaCO_3$ | $CaC_2O_4$ |
| Dequest 2000 | 100 | 50 |
| Actophos | 50 | 10 |
| Goodrite K732 | 36 | 23 |
| Dequest 2010 | 82 | 30 |
| Goodrite K XP11 | 22 | 89 |
| Dequest 2054 | 100 | 14 |
| Dequest 2041 | 100 | 32 |
| Belclene 283 | 76 | 94 |
| Belclene 200 | 69 | 38 |

Dequest 2000 is Amino tri (methylene-phosphonic acid) (AMP), Dequest 2010 is 1-hydroxyethylidene-1,1-diphosphonic acid (HEDP), Dequest 2054 is a potassium salt of hexamethylenediamine tetra(methylene-phosphonic acid)(HDTMP), Dequest 2041 is ethylene diamine tetramethylene phosphoric acid (EDTMP) all available from Monsanto Co., of St. Louis, Mo. Actophos is sodium hexametaphosphate available from FMC Corp., of Philadelphia, Pa. Goodrite K732 and Goodrite KXP11 are polyacrylic acids available from B. F. Goodrich of Cleveland, Ohio.

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. A method of inhibiting the formation and deposition of calcium oxalate in aqueous systems having a pH of at least about 7.0, comprising adding to the system from about 1 to about 100 parts per million of a hydrolyzed terpolymer of maleic anhydride, ethylacrylate, and vinyl acetate, wherein the molar ratio of maleic anhydride to the combined moles of vinyl acetate and ethylacrylate is from about 2.5:1 to 5:1, the molar ratio of vinyl acetate to ethylacrylate is from abut 1:4 to 4:1, and the molecular weight of the terpolymer is below about 4000.

2. The method of claim 1 wherein said aqueous system is a process liquid in a papermaking system.

3. The method of claim 1 wherein said aqueous system is a process liquid in a bleach plant and/or a sulfite mill in a papermaking system.

4. The process of claim 1 wherein the molar ratio of vinyl acetate to ethylacrylate is from about 1:3 to 3:1.

* * * * *